United States Patent [19]

Phillips et al.

[11] Patent Number: 4,669,957
[45] Date of Patent: Jun. 2, 1987

[54] FILM COOLANT PASSAGE WITH SWIRL DIFFUSER

[75] Inventors: James S. Phillips, Jupiter; Robert E. Field, Tequesta, both of Fla.

[73] Assignee: United Technologies Corporation, Hartford, Conn.

[21] Appl. No.: 812,102

[22] Filed: Dec. 23, 1985

[51] Int. Cl.⁴ .................................................. F01D 5/18
[52] U.S. Cl. ........................................ 416/97 R; 415/115
[58] Field of Search ...................... 416/97 R, 97 A; 415/115; 60/757

[56] References Cited

U.S. PATENT DOCUMENTS

| 1,857,509 | 5/1932 | Holmstrom . | |
| 2,149,510 | 3/1939 | Darrieus | 60/41 |
| 2,220,420 | 11/1940 | Meyer | 60/41 |
| 2,236,426 | 3/1941 | Faber | 60/41 |
| 2,477,583 | 8/1949 | De Zubay et al. | 60/44 |
| 2,489,683 | 11/1949 | Stalker | 60/41 |
| 3,098,148 | 7/1963 | Diot et al. | 219/69 |
| 3,303,645 | 2/1967 | Ishibashi | 60/39.65 |
| 3,447,318 | 6/1969 | Caruel et al. | 60/39.65 |
| 3,515,499 | 6/1970 | Beer et al. | 416/95 |
| 3,527,543 | 9/1970 | Howald | 416/90 |
| 3,594,536 | 7/1971 | Holroyd | 219/69 |
| 3,619,076 | 11/1971 | Kydd | 416/90 |
| 3,635,586 | 1/1972 | Keat et al. | 416/97 |
| 3,746,827 | 7/1973 | Martin et al. | 219/69 |
| 3,778,183 | 12/1973 | Luscher et al. | 415/115 |
| 3,799,696 | 3/1974 | Redman | 416/97 |
| 3,801,218 | 4/1974 | Moore | 416/97 A |
| 3,830,450 | 8/1974 | Williams et al. | 244/42 |
| 3,844,677 | 10/1974 | Evans | 416/84 |
| 3,889,903 | 6/1975 | Hilby | 244/42 |
| 3,915,106 | 10/1975 | De Witt | 114/66.5 |
| 3,978,662 | 9/1976 | Dubell et al. | 60/760 X |
| 3,995,422 | 12/1976 | Stamm | 60/39.66 |
| 4,142,824 | 3/1979 | Andersen | 415/115 |
| 4,162,136 | 7/1979 | Parkes | 416/97 |
| 4,168,938 | 9/1979 | Dodd | 416/97 |
| 4,197,443 | 4/1980 | Sidenstick | 219/69 |
| 4,214,722 | 7/1980 | Tamura | 244/208 |
| 4,259,842 | 4/1981 | Koshoffer et al. | 60/757 |
| 4,267,698 | 5/1981 | Hartmann et al. | 60/756 |
| 4,303,374 | 12/1981 | Braddy | 416/97 |
| 4,314,442 | 2/1982 | Rice | 60/39.05 |
| 4,347,037 | 8/1982 | Corrigan | 416/97 A |
| 4,380,906 | 4/1983 | Dierberger | 60/757 |
| 4,384,823 | 5/1983 | Graham | 416/1 |
| 4,505,639 | 3/1985 | Groess et al. | 415/115 |
| 4,529,358 | 7/1985 | Papell | 416/97 A |
| 4,565,490 | 1/1986 | Rice | 415/115 X |

FOREIGN PATENT DOCUMENTS

| 599697 | 6/1960 | Canada | 415/115 |
| 2840103 | 3/1979 | Fed. Rep. of Germany | 415/115 |
| 55-114806 | 9/1980 | Japan . | |
| 47103 | 3/1983 | Japan | 415/115 |
| 665155 | 1/1952 | United Kingdom . | |

OTHER PUBLICATIONS

Flight and Aircraft Engineer, No. 2460, vol. 69, 3-1-6-56, pp. 292-295.

Advances in Heat Transfer, by Richard J. Goldstein, vol. 7, Academic Press, (N.Y., 1971), The Monograph Film Cooling, pp. 321-379.

NASA Technical Paper 1546 Influence of Coolant Tube Curvature on Film Cooling Effectiveness as Detected by Infrared Imagery, by S. Stephen Papell et al, 1979.

Primary Examiner—Everette A. Powell, Jr.
Attorney, Agent, or Firm—Stephen E. Revis

[57] ABSTRACT

The wall of a hollow turbine airfoil has a longitudinally extending coolant outlet slot in its external surface which intersects, along its length, a longitudinally extending cylindrical channel within the wall. Metering passages extend from the inside surface of the airfoil wall to the cylindrical channel and direct a metered amount of coolant into the channel in a manner which results in a swirling motion being imparted to the fluid as the fluid diffuses within the channel. The coolant is thereupon ejected from the channel through the slot in the external surface as a film on the external surface of the airfoil along the length of the slot. The swirling of the fluid within the cylindrical channel helps diffuse the fluid such that the outlet slot becomes completely filled with coolant, whereby a film of coolant is created on the airfoil surface downstream of the slot over the full length of the slot.

6 Claims, 14 Drawing Figures

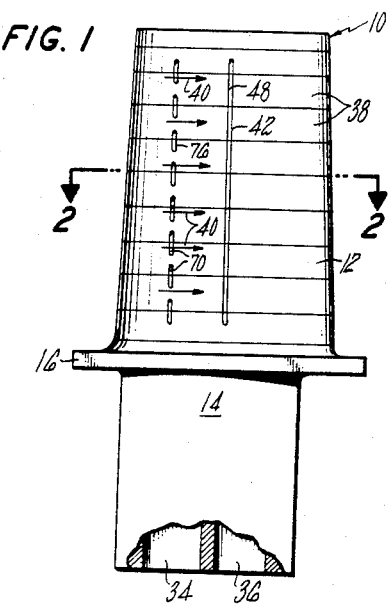
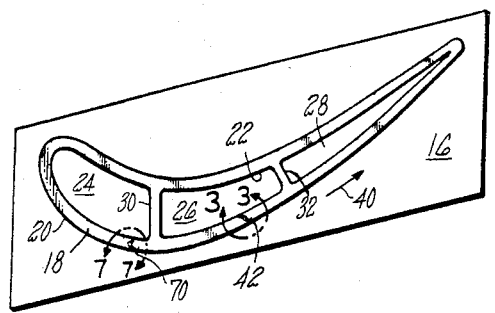
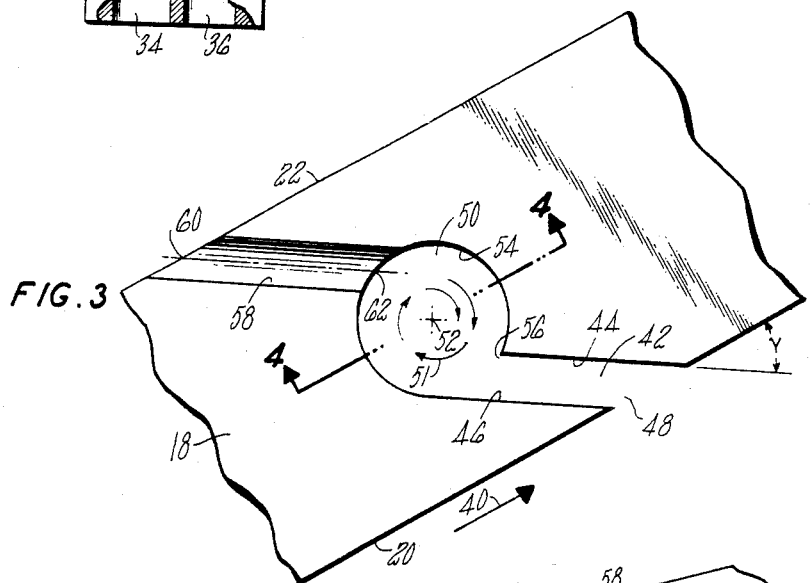
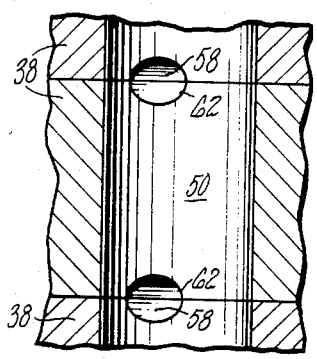
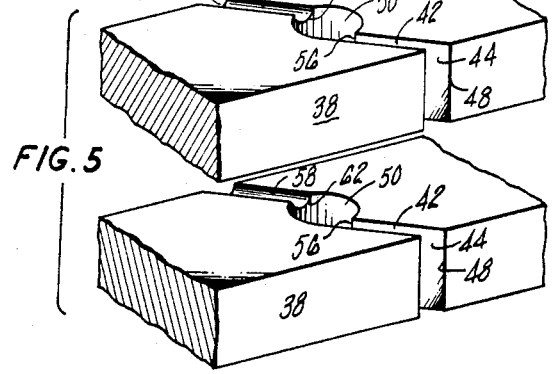

FIG. 6
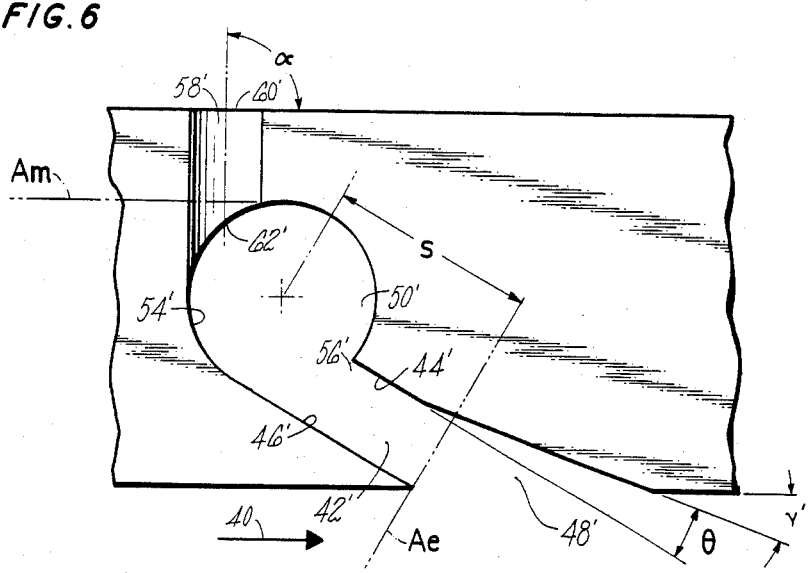
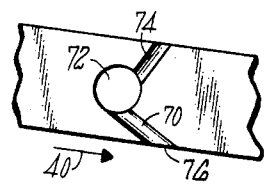
FIG. 7
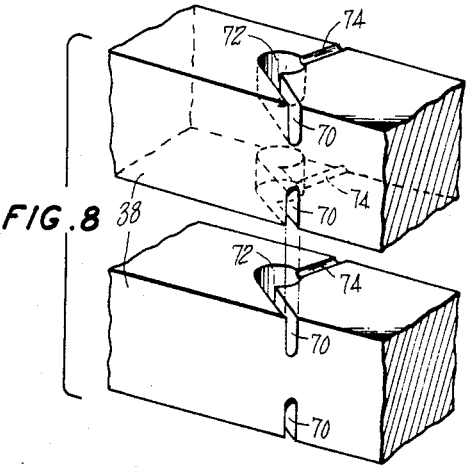
FIG. 8

FIG. 13 PRIOR ART
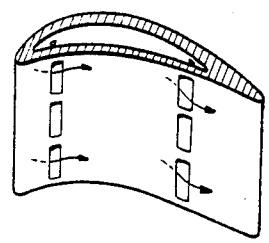
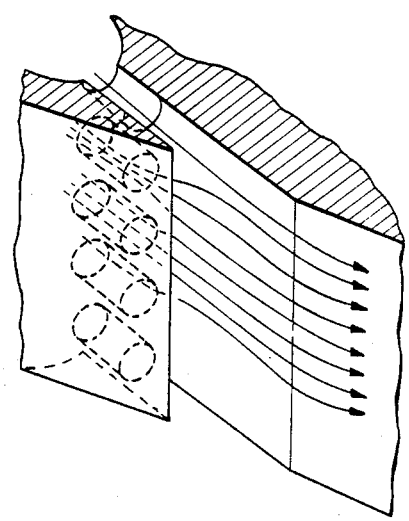
FIG. 14 PRIOR ART

FILM COOLANT PASSAGE WITH SWIRL DIFFUSER

The Government has rights in this invention pursuant to Contract No. F33615-78-C-2059 awarded by the Department of the Air Force.

DESCRIPTION

1. Technical Field

This invention relates to film cooling, and more particularly to film cooled airfoils.

2. Background Art

It is well known the external surface of airfoils may be cooled by conducting cooling air from an internal cavity to the external surface via a plurality of small passages. It is desired that the air exiting the passages remain entrained in the boundary layer on the surface of the airfoil for as long a distance as possible downstream of the passage to provide a protective film of cool air between the hot mainstream gas and the airfoil surface. The angle which the axis of the passage makes with the airfoil surface and its relation to the direction of hot gas flow over the airfoil surface at the passage breakout are important factors which influence film cooling effectiveness. Film cooling effectiveness E is defined as the difference between the temperature of the main gas stream ($T_g$) and the temperature of the coolant film ($T_f$) at a distance x downstream of the passage outlet, divided by the temperature difference between the temperature of the main gas stream and the coolant temperature ($T_c$) at the passage outlet (i.e., at x=0) thus, $E=(T_g-T_f)/(T_g-T_c)$. Film cooling effectiveness decreases rapidly with distance x from the passage outlet. Maintaining high film cooling effectiveness for as long a distance as possible over as large a surface area as possible is the main goal of airfoil film cooling.

It is well known in the art, that the engine airfoils must be cooled using a minimum amount of cooling air, since the cooling air is working fluid which has been extracted from the compressor and its loss from the gas flow path rapidly reduces engine efficiency. Airfoil designers are faced with the problem of cooling all the engine airfoils using a specified, maximum cooling fluid flow rate. The amount of fluid which flows through each individual cooling passage from an internal cavity into the gas path is controlled by the minimum cross-sectional area (metering area) of the cooling passage. The metering area is typically located where the passage intersects the internal cavity. The total of the metering areas for all the cooling passages and orifices leading from the airfoil controls the total flow rate of coolant from the airfoil, assuming internal and external pressures are fixed or at least beyond the designer's control. The designer has the job of specifying the passage size and the spacing between passages, as well as the shape and orientation of the passages, such that all areas of the airfoil are maintained below critical design temperature limits determined by the airfoil material capability, maximum stress, and life requirement considerations.

Ideally, it is desired to bathe 100% of the airfoil surface with a film of cooling air; however, the air leaving the passage exit generally forms a cooling film stripe no wider than or hardly wider than the dimension of the passage exit perpendicular to the gas flow. Limitations on the number, size, and spacing of cooling passages results in gaps in the protective film and/or areas of low film cooling effectiveness which may produce localized hot spots. Airfoil hot spots are one factor which limits the operating temperature of the engine.

U.S. Pat. No. 3,527,543 to Howald uses divergently tapered passages of circular cross section to increase the entrainment of coolant in the boundary layer from a given passage. The passages are also preferably oriented in a plane extending in the longitudinal direction or partially toward the gas flow direction to spread the coolant longitudinally upon its exit from the passage as it moves downstream. Despite these features, it has been determined by smoke flow visualization tests and engine hardware inspection that the longitudinal width of the coolant film from an eliptical passage breakout (i.e. Howald) continues to expand longitudinally only about a maximum of one passage exit minor diameter after the coolant is ejected on the airfoil surface. This fact, coupled with typical longitudinal spacing of three to six diameters between passages, result in areas of airfoil surface between and downstream of longitudinally spaced passages which receive no cooling fluid from that row of passages. Conical, angled passages as described in Howald U.S. Pat. No. 3,527,543 provide at best probably no more than 70% coverage (percentage of the distance between the centers of adjacent hole breakouts which is covered by coolant).

The velocity of the air leaving the cooling passage is dependent on the ratio of its pressure at the passage inlet to the pressure of the gas stream at the passage outlet. In general the higher the pressure ratio, the higher the exit velocity. Too high an exit velocity results in the cooling air penetrating into the gas stream and being carried away without providing effective film cooling. Too low a pressure ratio will result in gas stream ingestion into the cooling passage causing a complete loss of local airfoil cooling. Total loss of airfoil cooling usually has disastrous results, and because of this a margin of safety is usually maintained. This extra pressure for the safety margin drives the design toward the high pressure ratios. Tolerance of high pressure ratios is a desirable feature of film cooling designs. Diffusion of the cooling air flow by tapering the passage, as in the Howald patent discussed above is beneficial in providing this tolerance, but the narrow diffusion angles taught therein (12° maximum included angle) require long passages and, therefore, thick airfoil walls to obtain the reductions in exit velocities often deemed most desirable to reduce the sensitivity of the film cooling design to pressure ratio. The same limitation exists with respect to the trapezoidally shaped diffusion passages described in Sidenstick, U.S. Pat. No. 4,197,443. The maximum included diffusion angles taught therein in two mutually perpendicular planes are 7° and 14°, respectively, in order to assure that separation of the cooling fluid from the tapered walls does not occur and the cooling fluid entirely fills the passage as it exits into the hot gas stream. With such limits on the diffusing angles, only thicker airfoil walls and angling of the passages in the airfoil spanwise direction can produce wider passage outlets and smaller gaps between passages in the longitudinal direction. Wide diffusion angles would be preferred instead, but cannot be achieved using prior art teachings.

Japanese Patent No. 55-114806 shows, in its FIGS. 2 and 3 (reproduced herein as prior art FIGS. 13 and 14), a hollow airfoil having straight cylindrical passages disposed in a longitudinal row and emptying into a longitudinally extending slot formed in the external surface of the airfoil. While that patent appears to teach that the flow of cooling fluid from adjacent passages blends to form a film of cooling fluid of uniform thickness over the full length of the slot by the time the cooling fluid exits the slot and reaches the airfoil surface, our test experience indicates that the coolant fluid from the cylindrical passages moves downstream as a stripe of essentially constant width, which is substantially the diameter of the passage. Any diffusion which results in blending of adjacent stripes of coolant fluid occurs so far downstream that film cooling effectiveness at that point is well below what is required for most airfoil designs.

U.S. Pat. No. 3,515,499 to Beer et al describes an airfoil made from a stack of etched wafers. The finished airfoil includes several areas having a plurality of longitudinally spaced apart passages leading from an internal cavity to a common, longitudinally extending slot from which the cooling air is said to issue to form a film of cooling air over the airfoil external surface. In FIG. 1 thereof each passage appears to converge from its inlet to a minimum cross-sectional area where it intersects the slot. In the alternate embodiment of FIG. 9, the passage appears to have a small, constant size which exits into a considerably wider slot. Both configurations are likely to have the same drawbacks as discussed with respect to the Japanese patent; that is, the cooling fluid will not uniformly fill the slot before it enters the main gas stream, and considerably less than 100% film coverage downstream of the slot is likely.

Other publications relating to film cooling the external surface of an airfoil are U.S. Pat. Nos. 2,149,510; 2,220,420; 2,489,683; and "Flight and Aircraft Engineer" No. 2460, Vol. 69, 3/16/56, pp. 292-295, all of which show the use of longitudinally extending slots for cooling either the leading edge or pressure and suction side airfoil surfaces. The slots shown therein extend completely through the airfoil wall to communicate directly with an internal cavity. Such slots are undesireable from a structural strength viewpoint; and they also require exceedingly large flow rates.

U.S. Pat. No. 4,303,374 shows a configuration for cooling the exposed, cut-back surface of the trailing edge of an airfoil. The configuration includes a plurality of longitudinally spaced apart, diverging passages within the trailing edge. Adjacent passages meet at their outlet ends to form a continuous film of cooling air over the cut-back surface.

A serial publication, "Advances in Heat Transfer" edited by T. F. Irvine, Jr. and J. P. Hartnett, Vol. 7, Academic Press (N.Y. 19717) includes a monograph titled Film Cooling, by Richard J. Goldstein, at pp. 321-379, which presents a survey of the art of film cooling. The survey shows elongated slots of different shapes extending entirely through the wall being cooled, and also passages of circular cross section extending through the wall.

DISCLOSURE OF INVENTION

One object of the present invention is improved means for cooling a wall over which a hot gas stream is flowing.

According to the present invention, a wall to be cooled is adapted to have a coolant fluid on a first side thereof and a hot gas flowing on a second side thereof, wherein the wall includes a cylindrical diffuser channel formed therein having an axis extending in a first direction, a metering passage extending from the coolant fluid side of the wall and intersecting the cylindrical surface of the channel for introducing a metered amount of coolant fluid into the channel, and a slot elongated in the first direction having one end intersecting substantially the full length of the cylindrical channel to form the slot inlet and the other end intersecting the surface of the second side of the wall to define the slot outlet, wherein the metering passage is oriented to direct coolant fluid into the cylindrical channel to impart a swirling motion to the fluid, and wherein the slot is oriented to direct coolant fluid from the channel outlet as a film over the surface of the second side of the wall.

The cylindrical channel acts as a diffuser and swirler, creating turbulence in the flow as it leaves the metering section. The coolant leaves the channel via the slot inlet and spreads out to fill the entire slot before it leaves the slot outlet and becomes a continuous film on the wall surface which extends the full length of the slot. It is believed that the swirling and turbulence causes diffusion of the coolant fluid within the channel and is the mechanism which helps the coolant fill the entire slot, achieving a continuous coolant film over the length of the slot for maximum cooling effectiveness.

The present invention is particularly suited to cooling the walls of a hollow airfoil, such as is used in the turbine section of a gas turbine engine. The walls of the airfoil define a coolant compartment therewithin which receives coolant fluid, under pressure, from elsewhere in the engine. The slot is basically comprised of a pair of closely spaced apart walls which may be parallel from the slot inlet to outlet, or which may be parallel near the slot inlet and then may diverge to the outlet. Preferably the slot is elongated in the spanwise direction of the airfoil. The number of metering passages which feed the cylindrical channel depend upon the length of the slot, which is substantially the same as the length of the cylindrical channel. The metering passages are preferably oriented to direct the coolant fluid into the channel substantially tangential to the surface of the channel or in such a manner as to impart a swirling motion to the fluid about the axis of the channel. The slot walls intersect the hot outer surface of the airfoil at a shallow angle to direct the coolant fluid from the slot in the direction of the hot gas flow over the surface (i.e., the downstream direction) such that the coolant becomes entrained in the boundary layer on external surface of the airfoil and remains entrained for a considerable distance downstream of the slot outlet. The coolant thereby provides a thermal barrier between the airfoil surface and the hot gas.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 1 is a hollow turbine blade, partly broken away, which incorporates the features of the present invention.

FIG. 2 is a sectional view taken along the line 2-2 of FIG. 1.

FIG. 3 is an enlarged view of the area designated 3-3 in FIG. 2.

FIG. 4 is a sectional view taken along the line 4—4 of FIG. 3.

FIG. 5 is an exploded, perspective view of a portion of two adjacent wafers of the airfoil of FIG. 1 illustrating the coolant passages of the present invention.

FIG. 6 is a view analogous to the view shown in FIG. 3 showing an alternate configuration for the coolant passage of the present invention.

FIG. 7 is an enlarged view of the area designated 7—7 of FIG. 2.

FIG. 8 is an exploded perspective view of a portion of two adjacent wafers of the airfoil of FIG. 1 illustrating the coolant passages of FIG. 7.

FIGS. 13 and 14 are reproductions of FIGS. 2 and 3, respectively, of prior art Japanese Patent No. 55-114806.

BEST MODE FOR CARRYING OUT THE INVENTION

Figure 9:
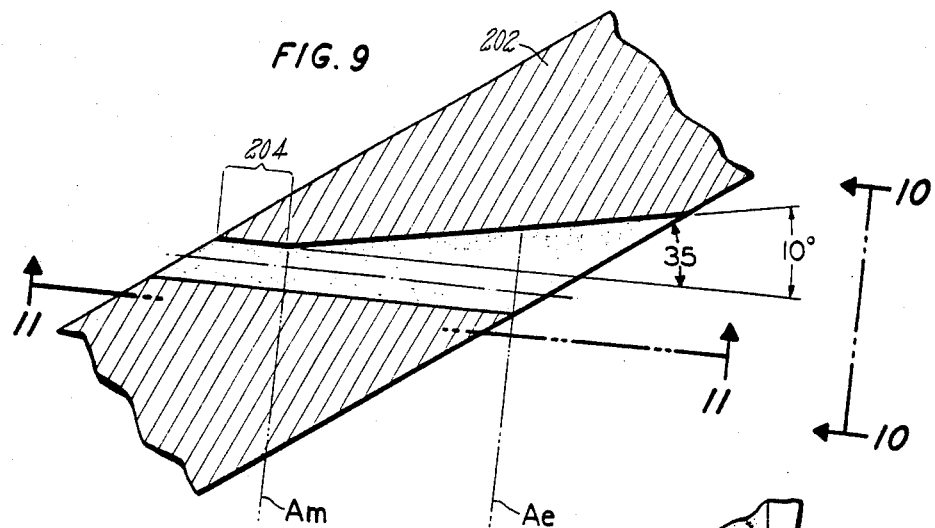
FIGS. 9–11 show the baseline coolant passage configuration against which comparisons of the present invention may be made.

As an examplary embodiment of the present invention, consider the turbine blade of FIG. 1 generally represented by the reference numeral 10. With reference to FIGS. 1 and 2, the blade 10 comprises a hollow airfoil 12 which extends in a spanwise or longitudinal direction from a root 14 which is integral therewith. A platform 16 is disposed at the base of the airfoil 12. The airfoil 12 comprises a wall 18 having an outer surface 20 and an inner surface 22. The inner surface 22 defines a longitudinally extending internal cavity which is divided into a plurality of adjacent longitudinally extending compartments 24, 26, 28, respectively, by longitudinally extending ribs 30, 32. The passages 34, 36 within the root 14 communicate with the compartments 24, 26, and 28. When the blade 10 is operated in its intended environment, such as in the turbine section of a gas turbine engine, coolant pressure from a suitable source, such as compressor bleed air, is fed into the passages 34, 36 and pressurizes the compartments 24, 26, and 28.

For reasons which will hereinafter become apparent, the airfoil 12 is formed of a plurality of cordwise extending wafers 38. Each wafer has an external airfoil shape, and is formed with holes, notches, channels, and the like, such that when the wafers are stacked and bonded to each other they form the airfoil 12 with all the desired channels and cavities therewithin. Blades and airfoils made from wafers of this type are well known in the art. For example, they are described in U.S. Pat. No. 3,515,499 Beer et al and commonly owned U.S. Pat. No. 3,301,526 Chamberlin, both of which are incorporated herein by reference.

Throughout the drawing the arrows 40 represent the direction of flow (i.e., streamlines) of hot gases over the surface of the airfoil. Fur purposes of the description of the present invention, the directon of flow of hot gases over either the pressure or suction side surfaces of the airfoil shall be considered the downstream direction. Thus, at any point on the suction or pressure side surface of the airfoil, the downstream directon is tangent to the surface of the airfoil and, except, perhaps, close to the airfoil tip or the airfoil base near the platform 16 where atypical currents are generated, is substantially perpendicular to the spanwise direction of the airfoil.

In accordance with one embodiment of the present invention, the airfoil 12 includes a longitudinally extending slot 42 in the suction side of the airfoil wall 18. The slot 42 extends over substantially the full spanwise length of the airfoil, although, as will be described hereinafter with respect to an alternate embodiment of the present invention, this is not a requirement. As best seen in FIGS. 3, 4, and 5, the slot 42 is comprised of a pair of parallel, closely spaced apart, oppositely facing, longitudinally extending surfaces 44, 46 which intersect the external surface 20 of the airfoil to form a longitudinally extending slot outlet 48. A cylindrical channel 50 is formed in the wall 18, has its axis 52 parallel to the length of the slot 42, and is substantially the same length as the slot 42. The walls 44, 46 intersect the surface 54 of the channel 50 to define the slot inlet 56. A plurality of cylindrical metering passages 58 (or other suitable cross-sectional shape) are spaced apart along the longitudinal length of the channel 50. Each metering passage 58 intersects the internal wall 22 of the airfoil to define a plurality of inlets 60; and they intersect the surface 54 of the channel 50 to form metering passage outlets 62. The passages 58 thereby provide fluid communication between the coolant compartment 26 and the channel 50.

In the exploded view of FIG. 5, two adjacent wafers are shown having portions of the slot 42 and corresponding portions of the channel 50 formed therein, both of which extend through the full thickness of each wafer. Half of each metering passage 58 is formed in opposing surfaces of adjacent waffers to define the entire metering passage when the waffers are bonded together. There need not be a metering passage 58 at every interface, although, for purposes of illustration, this is shown to be the case in FIG. 4.

As best shown in FIG. 3, the metering passages 58 are oriented to direct coolant fluid from the compartment 26 into the channel 50 substantially tangential to the channel wall 54 so as to impart a swirling motion to the fluid about the axis 52 of the channel. As the air leaves the metering passage 58 it diffuses since the volume of the channel 50 is many times larger than the total volume of all the metering passages 58 which carry coolant into the channel. The swirling of the coolant while diffusing improves its heat transfer capabilities by increasing the amount of surface area of the channel 50 with which it comes into contact.

The slot 42 is oriented to direct coolant fluid from its outlet 48 in a downstream direction. Preferably the surfaces 44, 46 intersect the external surface 20 of the airfoil at a shallow angle of no more than about 40° and most preferably 30° or less. This minimizes penetration of the coolant stream into the hot gas stream in a direction perpendicular to the outer surface of the airfoil. Excessive penetration can result in the coolant being immediately swept away from the surface 20 of the airfoil as opposed to remaining attached to the surface of the airfoil as a film of coolant downstream of the slot outlet 48. For purposes of later reference, the slot surface 44 is hereinafter referred to as the downstream surface 44, and the slot surface 46 is hereinafter referred to as the upstream surface 46 in view of their positions relative to each other and the downstream direction 40.

The creation of swirling movement of coolant fluid within the channel 50 is an important aspect of the present invention. It is therefore important that the metering passages 58 do not have their centerlines substantially in the plane of the slot. If they were aligned, then coolant fluid from the passages 58 would flow along direct lines into the slot 42. A substantial portion of that fluid would remain as a cohesive stream of circular cross-section as it passes into and through the slot. It would tend to leave the slot outlet 48 as narrow concentrations of fluid along the length of the slot outlet. Most preferably the metering passages 58 and the slot 42 are oriented relative to the cylindrical channel 50 such that not only is the coolant fluid swirled within the channel 50 (in the direction of the arrow 51 in FIG. 3) but it is forced to sharply change direction within the channel 50 to enter the slot outlet 56. It is believed that this combination of swirling, change in direction, and the turbulence created is instrumental in causing the relatively small amount of air from the metering passages 58 to expand to completely fill the larger volume of the slot 42. This is essential if the film of coolant air created over the surface of the airfoil downstream of the slot outlet 48, is to be continuous over the full length of the slot.

FIG. 6 shows an alternate embodiment for the coolant passage configuration of the present invention. Elements and features of FIG. 6 which have corresponding elements and features in FIG. 3 have been identified using the same reference numerals as in FIG. 3, except primed. In this embodiment the metering passages have been relocated to show an alternate, acceptable orientation. Also, although the slot surfaces 44', 46' are parallel for a short distance from the slot inlet 56', the downstream surface 44' thereafter diverges from the surface 46' at a small angle θ of preferably 10° or less. This reduces the angle at which the air is ejected relative to the downstream direction 40 at the slot outlet, which helps the coolant fluid attach itself to the wall downstream of the slot outlet.

Another embodiment of the present invention is best described with respect to FIGS. 1, 7, and 8. As shown in FIG. 1, the airfoil 12 also includes a row of longitudinally spaced apart slots 70 which is fed coolant from the compartment 24. Each slot 70 communicates with a cylindrical channel 72 whose axis is parallel to the spanwise length of the slot 70. Each channel 72 is intersected by a single metering passage 74. The essential difference between this alternate configuration and the configuration described with respect to FIGS. 3-5 is that the slots 70, although having outlets 76 which are elongated in the spanwise direction, are fairly short. The cylindrical channels 72 are correspondingly short in length. In this exemplary embodiment the short length requires only a single metering passage 74 for each slot 70. The slot cross-sectional area can be set at any value to optimize film cooling effectiveness.

As shown in FIG. 8, opposing halves of each slot 70, channel 72, and cylindrical metering passage 74 are formed in the abutting, bonded together surfaces of adjacent wafers 38 such that when the wafers are bonded together the corresponding halves of the slot 70, channel 72, and passage 74 are aligned to define a complete coolant passage extending from the compartment 24 to the external surface 20 of the airfoil.

For purposes of clarity the airfoil 12 shown in FIGS. 1 and 2 has been greatly simplified. An actual turbine airfoil might include several slots, like the slot 48, and several rows of slots, like the slots 70, or spanwise rows of coolant passages of other configurations well known in the art. These slots and coolant passages, including those of the present invention, could be on either the pressure or suction side of the airfoil. Thus, the airfoil shown in the drawing is intended to be illustrative only and not limiting.

Figure 10:
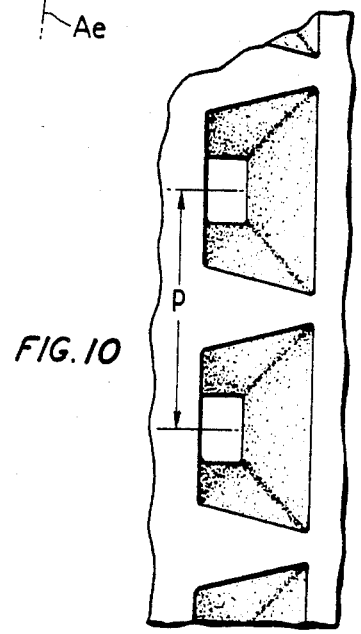
Figure 11:
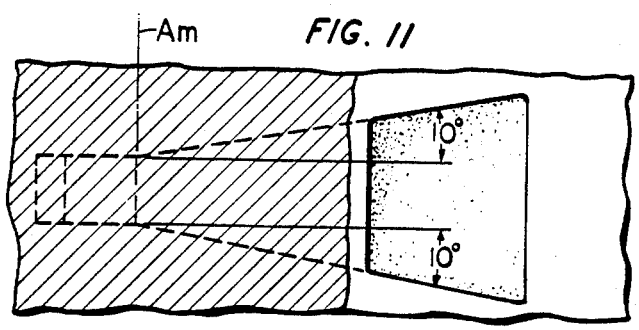
Figure 12:
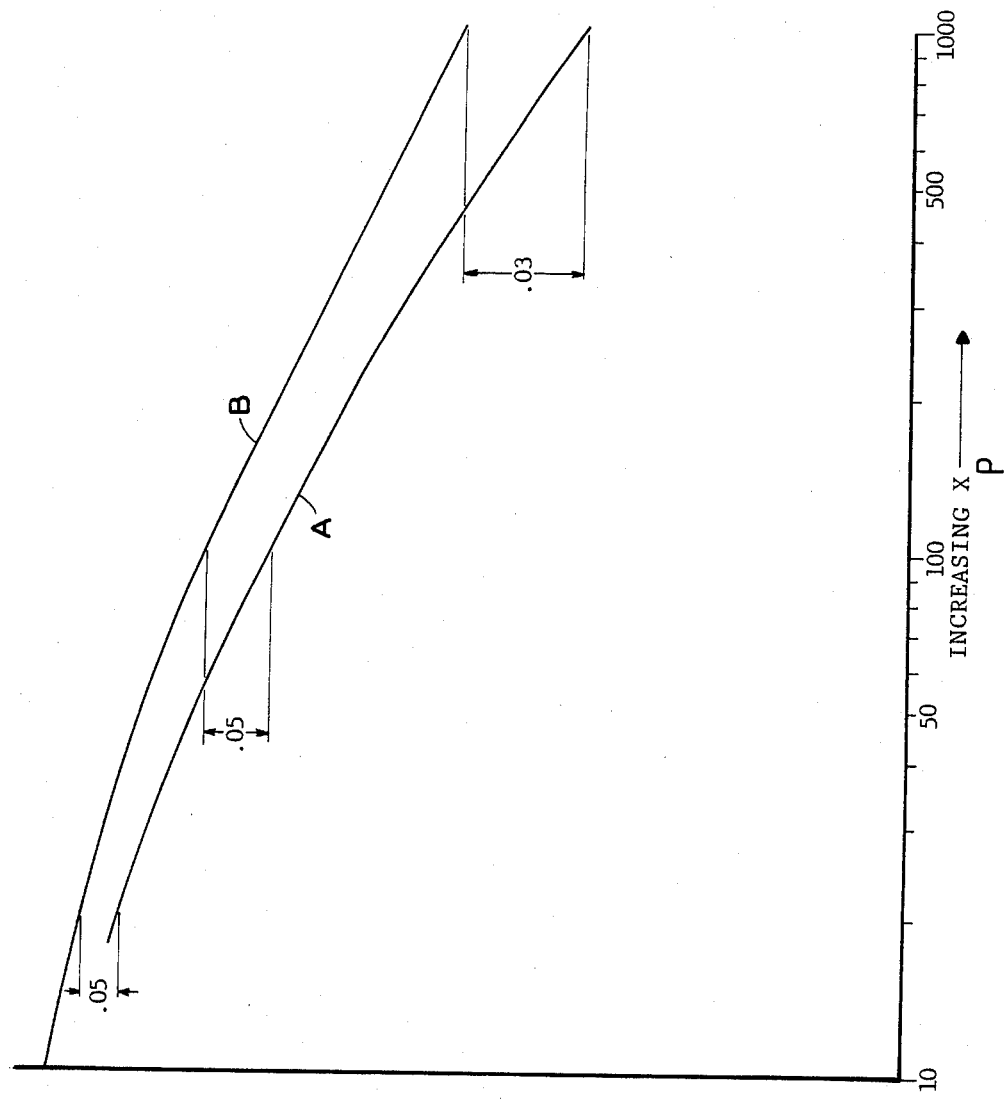
FIG. 12 is a graph which may be used to compare film cooling effectiveness of a coolant passage configuration of the present invention to that of the baseline configuration of FIGS. 9–11.

For purposes of comparison, a flat plate having a coolant passage therethrough in accordance with the present invention was tested against the row of coolant passages (also in a flat plate) shown in FIGS. 9–11 (hereinafter the "baseline" configuration). These passages of FIGS. 9–11 are similar to the shaped holes described in U.S. Pat. No. 4,197,443 to Sidenstick except the divergence angles are 10°. The graph of FIG. 12 shows the test results. In FIG. 12 the horizontal axis is a dimensionless parameter P whose value is the ratio of the distance x from the outlet of the cooling passage (in the direction of the mainstream gas flow over the outlet) to a number directly related to the mass flow rate of cooling air exiting the passage. The vertical axis is a measure of the film cooling effectiveness E (as hereinabove defined) measured at the distance x downstream of the passage outlet. The maximum possible cooling effectiveness is 1.0. For these tests each point on the curves is the result of an average of a plurality of temperature measurements taken along either the full length of the row of holes 200 or along the full length of the slot, as the case may be. Because P is directly related to the distance from the passage outlet, and since the distance downstream of the outlet is the only variable in these tests, P may be considered as the measure of distance downstream of the passage outlet.

The curve labeled A is for a row of baseline shaped holes 200 through a test plate 202 such as shown in FIGS. 9–11. The area ratio $A_e/A_m$ for each passage was 3.6, where $A_e$ (exit area) is the cross-sectional area of the passage outlet measured in the plane labeled $A_e$ in FIG. 9, and where $A_m$ (metering area) is the cross-sectional area of the metering section 204 (FIG. 9) as measured in the plane labeled $A_m$. The pitch to diameter ratio, p/d, was 6.58, wherein p (FIG. 10) is the distance between the centers of adjacent metering sections 200, and d is the effective diameter of the metering section, which is the diameter of a circle having the cross-sectional area $A_m$.

The curve B is for a coolant passage according to the present invention formed in a flat test plate approximately 17 inches long, 1.6 inches wide, and 0.75 inches thick. (The thickness of the plate corresponds to the thickness of the wall to be cooled.) The cylindrical channel and the slot intersecting the channel extended about 16.3 inches or substantially the full length of the plate. In a cross section taken perpendicular to the axis of the cylindrical channel the plate looked exactly as shown in FIG. 6. The angle α was 90°; the angle θ was 10°; the angle γ' was 20°; The area ratio $A_e/A_m$ was 8.2; and the pitch to diameter ratio p/d was 5.48. $A_e$ was measured in the plane having that designation in FIG. 6. Which plane is perpendicular to the surface 46'. $A_m$ was the sum of all the cross-sectional areas of the metering passages 58' as measured in the plane labeled $A_m$ in FIG. 6. The pitch p was the distance between the centers of the metering passages 58'; and the diameter d was the effective diameter of a metering passage, which is the diameter of a circle having the same cross-sectional area as a metering passage. In the present test the metering passage was circular in cross section and had an effective diameter of about 0.16 inch. The distance s between the axis of the cylindrical channel and the exit plane $A_e$ was about 0.45 inch.

The improvement in film cooling effectiveness, E, provided by the present invention as compared to the baseline shaped holes is significant and can readily be seen in the graph of FIG. 12. For example, at P=20 and P=100 the baseline shaped holes had a cooling effectiveness about 0.05 less than the test configuration of the present invention. At P=1000 the difference was about 0.03. To put this in perspective, assuming a coolant temperature at the passage outlet of 1200° F. and a mainstream gas temperature of 2600° F., a 0.02 increase in cooling effectiveness translates into about a 28° F. decrease in the temperature of the coolant film for the same mass flow rate of coolant.

Although the invention has been shown and described with respect to a preferred embodiment thereof, it should be understood by those skilled in the art that other various changes and omissions in the form and detail of the invention may be made without departing from the spirit and scope thereof.

We claim:

1. A hollow, longitudinally extending airfoil including a cooled wall having an outer surface defining a pressure and suction surface of said airfoil, said pressure and suction surfaces adapted to have a hot gas stream flowing thereover in a downstream direction substantially perpendicular to said longitudinal direction, said cooled wall also having an inner surface adapted to define a portion of a coolant compartment for receiving coolant therein under pressure, the improvement comprising:

a longitudinally extending cylindrical diffuser channel formed within said wall defining a cylindrical surface and having an axis;

a pair of spaced apart, facing side surfaces forming a slot within said wall, said side surfaces intersecting said outer surface at a shallow angle to form a longitudinally extending slot outlet, and intersecting said channel cylindrical surface to form a slot inlet extending longitudinally substantially the full length of said cylindrical channel, said slot being oriented to direct coolant fluid therefrom as a continuous, longitudinally extending film over said outer surface downstream of said slot outlet; a single one of said slots intersecting each channel; and at least one metering passage formed within said wall for controlling the rate of flow of coolant fluid into said slot, said metering passage intersecting said inner surface of said wall to form an inlet for said metering passage and intersecting said diffuser channel cylindrical surface to form an outlet for said metering passage, said metering passage being oriented to direct coolant fluid into said diffuser channel so as to impart a swirling motion to the fluid about the axis of said channel.

2. The airfoil according to claim 1, wherein said slot side surfaces diverge to said slot outlet over at least a portion of the distance from said slot inlet to said slot outlet.

3. The airfoil according to claim 1 including a plurality of said metering passages spaced apart in said first direction.

4. The airfoil according to claim 1 wherein said cooled wall includes a plurality of said slots and a separate one of said channels for each slot, said slots disposed in a longitudinal row and spaced apart in said longitudinal direction and said channels aligned and spaced apart in said longitudinal direction, at least one of said metering passages intersecting each of said channels.

5. The airfoil according to claim 1 wherein said wall comprises a plurality of chordwise wafers which are stacked in said longitudinal direction and bonded together.

6. The cooled wall according to claim 4 wherein only one metering passage intersects each of said channels.

* * * * *